US012756338B2

(12) United States Patent
Ku et al.

(10) Patent No.: US 12,756,338 B2
(45) Date of Patent: Oct. 6, 2026

(54) FORCED DISCHARGE APPARATUS AND METHOD FOR HIGH VOLTAGE COMPONENT

(71) Applicants: HYUNDAI MOTOR COMPANY, Seoul (KR); KIA CORPORATION, Seoul (KR)

(72) Inventors: Do Yeon Ku, Seoul (KR); Taewoong Lim, Hwaseong-si (KR); ChanWoong Jo, Yongin-si (KR); Ji Wan Son, Yongin-si (KR); Chang Hwan Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 357 days.

(21) Appl. No.: 18/538,019

(22) Filed: Dec. 13, 2023

(65) Prior Publication Data

US 2025/0062706 A1 Feb. 20, 2025

(30) Foreign Application Priority Data

Aug. 16, 2023 (KR) ........................ 10-2023-0106720

(51) Int. Cl.
*H02P 6/24* (2006.01)
*H02P 3/18* (2006.01)
*H02P 6/182* (2016.01)
*H02P 6/20* (2016.01)

(52) U.S. Cl.
CPC ................ *H02P 6/20* (2013.01); *H02P 6/182* (2013.01)

(58) Field of Classification Search
CPC ...... H02P 3/18; H02P 6/20; H02P 6/24; H02P 6/182
USPC ........................................................ 318/400.1
See application file for complete search history.

(56) References Cited

U.S. PATENT DOCUMENTS 9,929,570 B2 * 3/2018 Ishibashi .................... H02J 7/00
2008/0252259 A1 * 10/2008 Suzuki .................. H02J 7/0048 320/136
2010/0214055 A1 * 8/2010 Fuji ......................... B60L 58/12 340/3.1
2011/0140665 A1 * 6/2011 Tamezane ............. H02J 7/0016 320/118
2014/0125260 A1 * 5/2014 Hashimoto ............. B60L 50/16 180/65.285
2014/0232183 A1 * 8/2014 Hirose .................... B60L 58/10 307/10.1
2014/0240872 A1 * 8/2014 Nomura ................ H02M 3/156 361/18

(Continued)

*Primary Examiner* — Gabriel Agared
(74) *Attorney, Agent, or Firm* — Lempia Summerfield Katz LLC

(57) ABSTRACT

A forced discharge apparatus for a high-voltage component may include a component unit connected to a power supply unit through a connector. The forced discharge apparatus may also include a forced discharge circuit connected between the power supply unit and the component unit. The forced discharge apparatus may also include a control unit configured to discharge the component unit through the forced discharge circuit such that a voltage of the component unit becomes below a target voltage in response to a detection that a back electromotive force generated from the component unit when the connector is separated.

14 Claims, 8 Drawing Sheets

(56) References Cited

U.S. PATENT DOCUMENTS

| | | | | |
|---|---|---|---|---|
| 2022/0052602 | A1 * | 2/2022 | Jin | H02J 7/0029 |
| 2023/0387713 | A1 * | 11/2023 | Otsuka | B60L 3/04 |

* cited by examiner

FORCED DISCHARGE APPARATUS AND METHOD FOR HIGH VOLTAGE COMPONENT

CROSS-REFERENCE TO RELATED APPLICATION

This application claims priority to and the benefit of Korean Patent Application No. 10-2023-0106720, filed in the Korean Intellectual Property Office on Aug. 16, 2023, the entire contents of which are incorporated herein by reference.

FIELD

The present disclosure relates to a forced discharge apparatus and method for a high-voltage component. More particularly, the present disclosure relates to a forced discharge apparatus and a forced discharge method for a high-voltage component capable of performing a forced discharge when a back electromotive force occurs at a high-voltage component.

BACKGROUND

For the safety of users and mechanics, high-voltage components (voltage of 60V or higher) of environment-friendly vehicles, including electric vehicles, must be able to apply an interlock function to cut off the power and perform forced discharge when the connector is removed. High-voltage components using a rated voltage of about 200 to 800 V may cause personal injury due to the remaining charge when the connector is removed, so the interlock function is enforced by law.

In the case of high-voltage components, freewheeling may occur due to external forces such as driving wind and inertia. When freewheeling occurs, motor back electromotive force is generated. The motor back electromotive force induced by continuous rotation, after the connector is removed, interferes with forced discharge. This prevents the voltage from being lowered to the level required by law (60V or less).

In the case of electric compressors, back electromotive force is not induced in the motor due to freewheeling, etc., so forced discharge is performed to the level required by law. On the other hand, when the forced discharge function for high-voltage components using a motor is evaluated, the voltage does not drop below a certain level (e.g., 220V) due to the generation of back electromotive force due to the motor rotations per minute (RPM) when freewheeling occurs during motor operation.

The above information disclosed in this Background section is only for enhancement of understanding of the background of the disclosure, and therefore it may contain information that does not form the prior art that is already known to a person of ordinary skill in the art.

SUMMARY

Embodiments of the present disclosure provide a forced discharge apparatus and method for a high-voltage component. The apparatus and the method may sufficiently perform forced discharge, to a required level, on a high-voltage component where freewheeling may be generated according to back electromotive force.

In one embodiment of the present disclosure, a forced discharge apparatus for a high-voltage component may include a component unit connected to a power supply unit through a connector, and a forced discharge circuit connected between the power supply unit and the component unit. The forced discharge apparatus may also include a control unit configured to discharge the component unit through the forced discharge circuit such that a voltage of the component unit becomes below a target voltage in response to a detection that a back electromotive force generated from the component unit when the connector is separated.

The forced discharge circuit may include a switching element connected to the control unit and comprises a power consumption element connected to the switching element.

The power consumption element may be electrically connected to the power supply unit through the switching element.

The power consumption element may include at least one of a resistor or a varistor.

When the back electromotive force is detected, the control unit may apply a switching signal to the switching element. When the switching signal is applied to the switching element, the power consumption element may be connected to both ends of the power supply unit to lower a voltage due to the back electromotive force.

The forced discharge apparatus may further include an interlock circuit configured to be connected to the power supply unit, the component unit, and a cooperative controller through the connector. The interlock circuit is configured to be disconnected when the connector is separated. When the interlock circuit is disconnected, the cooperative controller detects an occurrence of an interlock and requests an electrical power cut to a battery management system (BMS).

In another embodiment, the forced discharge apparatus may further include an interlock circuit configured to be connected to the control unit and the power supply unit through the connector and configured to be disconnected when the connector is separated. The control unit may be configured to detect an occurrence of an interlock according to a disconnection of the interlock circuit. The control unit may be configured to send an interlock occurrence signal to a cooperative controller configured to perform a cooperative control together with the control unit.

The control unit may be configured to detect an occurrence of an interlock based on a voltage change of the component unit generated when the connector is separated. The control unit may be configured to send an interlock occurrence signal to a cooperative controller when the occurrence of the interlock is detected.

In other embodiment of the present disclosure, a forced discharge method for a high-voltage component may include forcibly discharging a back electromotive force (namely, performing a forced discharge), by a forced discharge apparatus, when an occurrence of an interlock is detected according to separation of a connector between a power supply unit and a component unit. The forced discharge method may also include detecting, by the forced discharge apparatus, whether a back electromotive force occurs at the component unit. The forced discharge method may also include performing the forced discharge (i.e., forcibly discharging the back electromotive force), by the forced discharge apparatus, for discharging a voltage of the component unit to be below a target voltage, in response to detecting the occurrence of the back electromotive force.

Detecting whether the back electromotive force occurs may include determining whether the back electromotive force occurs at the component unit based on a comparison of a current voltage according to the forced discharge and a back electromotive force value according to operation RPM (revolutions per minute) of the component unit.

Performing the forced discharge may include applying a switching signal to a forced discharge circuit. The switching signal activates the forced discharge circuit that may include a switching element and a power consumption element.

The power consumption element may include at least one of a resistor or a varistor.

A forced discharge method may further include detecting the occurrence of the interlock, by a cooperative controller configured to detect whether an interlock circuit connected to the power supply unit, the component unit, and a cooperative controller is disconnected. The forced discharge method may further include requesting an electrical power cut to a battery management system (BMS). The forced discharge method may further include requesting the forced discharge to the forced discharge apparatus.

In one embodiment, performing the forced discharge may include detecting the occurrence of the interlock according to disconnection an interlock circuit connected to a control unit and the power supply unit. Performing the forced discharge may also include sending an interlock occurrence signal to a cooperative controller configured to perform a cooperative control together with the control unit.

Performing the forced discharge may include detecting the occurrence of the interlock by detecting a voltage change of the component unit generated according to separation of the connector. Performing the forced discharge may also include sending an interlock occurrence signal to a cooperative controller.

A forced discharge apparatus for a high-voltage component and a forced discharge method may sufficiently perform forced discharge, to a required level, on a high-voltage component where freewheeling may be generated.

DETAILED DESCRIPTION

Figure 1:
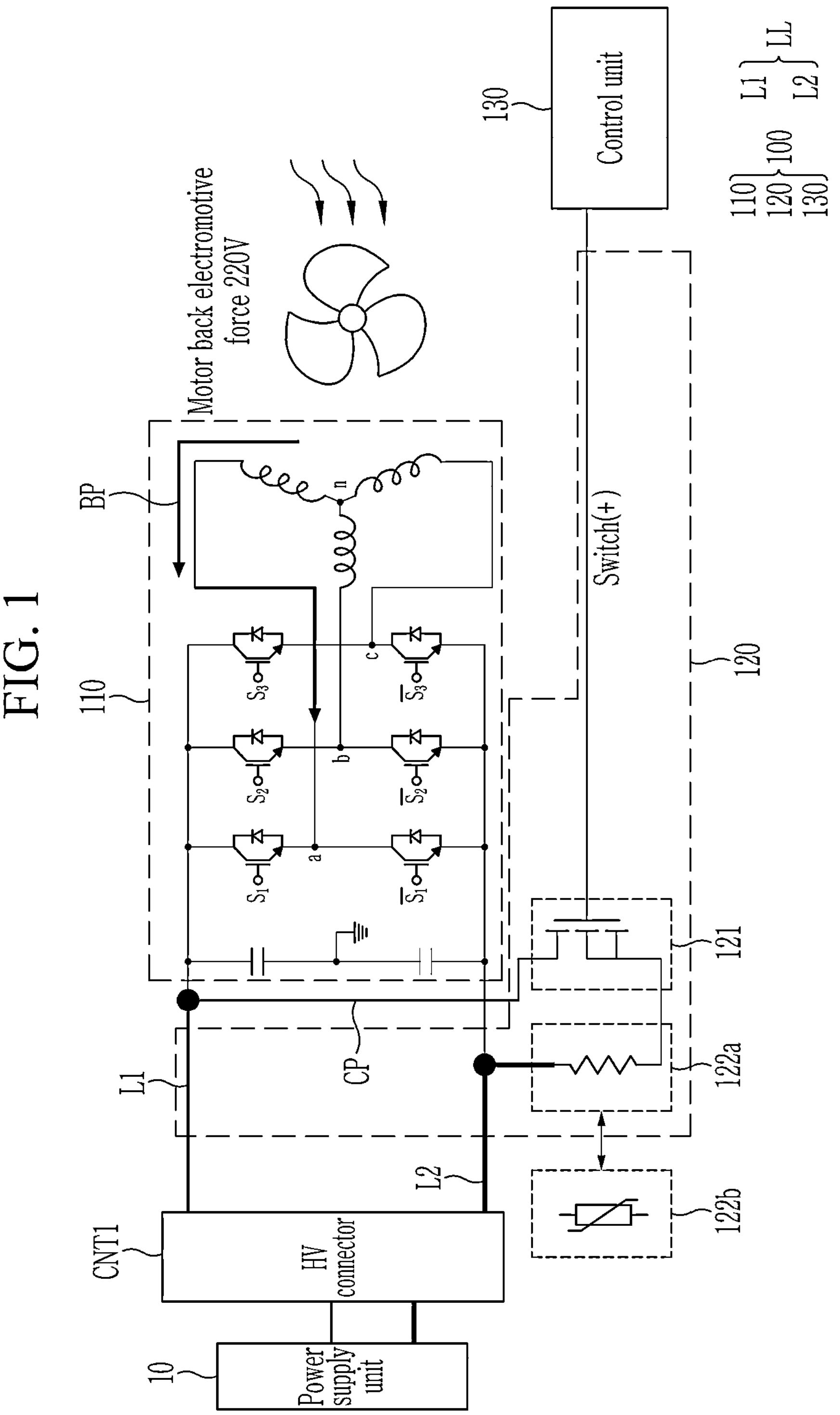
FIG. 1 is a circuit diagram of a forced discharge apparatus for a high-voltage component according to an embodiment.

Embodiments of the present disclosure are described more fully hereinafter with reference to the accompanying drawings such that a person skill in the art may easily implement the embodiments. As those having ordinary skill in the art would realize, the described embodiments may be modified in various different ways without departing from the spirit or scope of the present disclosure. In order to clarify the present disclosure, parts that are not related to the description has been omitted, and the same elements or equivalents are referred to with the same reference numerals throughout the present disclosure.

In addition, unless explicitly described to the contrary, the word "comprise" and variations, such as "comprises" or "comprising," should be understood to imply the inclusion of stated elements rather than the exclusion of any other elements. Terms including an ordinary number, such as first and second, are used for describing various constituent elements, but the constituent elements are not limited by the terms. The terms are only used to differentiate one component from other components.

In addition, the terms "unit", "part" or "portion", "-er", and "module" in the specification refer to a unit that processes at least one function or operation, which may be implemented by hardware, software, or a combination of hardware and software. When a unit, part, portion, module, or the like of the present disclosure is described as having a purpose or performing an operation, function, or the like, the unit, part, portion, module, or the like should be considered herein as being "configured to" meet that purpose or to perform that operation or function. Each of the unit, part, portion, module, and the like may separately embody or be included with a processor and a memory, such as a non-transitory computer readable media, as part of the apparatus.

Hereinafter, embodiments of the present disclosure are described with reference to the drawings.

FIG. 1 is a circuit diagram of a forced discharge apparatus for a high-voltage component according to an embodiment.

Referring to FIG. 1, a forced discharge apparatus for a high-voltage component 100 includes a component unit 110, a forced discharge circuit 120, and a control unit 130. A forced discharge apparatus for a high-voltage component 100 may be referred to as a forced discharge apparatus 100.

The component unit 110 may be connected to a power supply unit 10. The component unit 110 may be connected to the power supply unit 10 through a first connector CNT1. Electrical connection of the component unit 110 and the power supply unit 10 may be controlled according to connection and separation) of the first connector CNT1. The power supply unit 10 may include a high-voltage power source. The first connector CNT1 may be a high voltage connector.

The component unit 110 may be a high-voltage component using a rated voltage of approximately 200 to 800 V. The high-voltage components may correspond to components with an operating voltage of more than 60V DC or 30V AC or more. In an embodiment, the component unit 110 may include a motor. For example, the component unit 110 may be a high-voltage component that uses a motor as a power source, such as a high-voltage cooling fan. In the case of high-voltage cooling fans, a freewheeling phenomenon may occur. In the freewheeling phenomenon, the fan rotates due to external forces, such as driving wind and inertia. If a freewheeling phenomenon occurs in the component part 110, a motor back electromotive force BP may be generated. The back electromotive force BP may be an electromotive force generated from a motor in the opposite direction to the power supply voltage of the power supply unit 10. The back electromotive force BP interferes with forced discharges of the component unit 110.

The forced discharge circuit 120 may be connected between the power supply unit 10 and the component unit 110. The forced discharge circuit 120 may operate according to commands of the control unit 130. The forced discharge circuit 120 may perform a forced discharge, in which a voltage (e.g., 220V) due to a back electromotive force of the component unit 110 is lowered to a target voltage (e.g., 60V) or below.

The forced discharge circuit 120 may include a switching element 121 connected to the control unit 130 and power consumption elements 122*a* and 122*b* connected to the switching element 121.

The switching element 121 may operate by application of a switching signal of the control unit 130. The switching element 121 may be connected to the power supply unit 10. The switching element 121 may electrically connect or separate the power consumption elements 122*a* and 122*b* between the power supply unit 10 and the component unit 110. For example, the switching element 121 may include an IGBT or MOSFET.

The power consumption elements 122*a* and 122*b* may be electrically connected to the power supply unit 10 through the switching element 121. The power consumption elements 122*a* and 122*b* may include various elements for voltage drop.

In an embodiment, the power consumption elements 122*a* and 122*b* may include a first power consumption element 122*a* and a second power consumption element 122*b*. For example, the power consumption elements 122*a* and 122*b* may include at least one of a resistor or a varistor. The first power consumption element 122*a* may be a resistor. The second power consumption element 122*b* may be a varistor. In other words, the power consumption elements 122*a* and 122*b* may be selected from the resistor or varistor, depending on embodiments. That is, the second power consumption element 122*b* may replace the first power consumption element 122*a*, and vice versa. When the switching signal is applied to the switching element 121, the power consumption elements 122*a* and 122*b* are connected to both ends L1 and L2 of the power supply unit 10 and may lower a voltage due to the back electromotive force BP.

If the back electromotive force BP generated from the component unit 110 when the first connector CNT1 is separated is detected, the control unit 130 may discharge the component unit through the forced discharge circuit 120 such that a voltage of the component unit 110 becomes below the target voltage.

In an embodiment, when the first connector CNT1 is disconnected or separated, the control unit 130 may detect whether the back electromotive force BP occurs due to a break of an interlock circuit and/or the freewheeling of the high-voltage component.

When the back electromotive force BP is detected, the control unit 130 may apply the switching signal to the switching element 121. The control unit 130 may apply the switching signal to connect the power consumption elements 122*a* and 122*b* to both ends L1 and L2 extending from the power supply unit 10 and may lower the voltage due to the back electromotive force BP.

When the back electromotive force BP is detected, the control unit 130 turns ON the switching element 121, to flow current through a control path CP. In other words, the control unit 130 allows the current to flow from a first end L1 (high) to a second end L2 (low) through the control path CP. The control unit 130 enables, by using the power consumption elements 122*a* and 122*b* connected through the control path CP, that the voltage may be forced discharged to be 60V or below.

Figure 2:
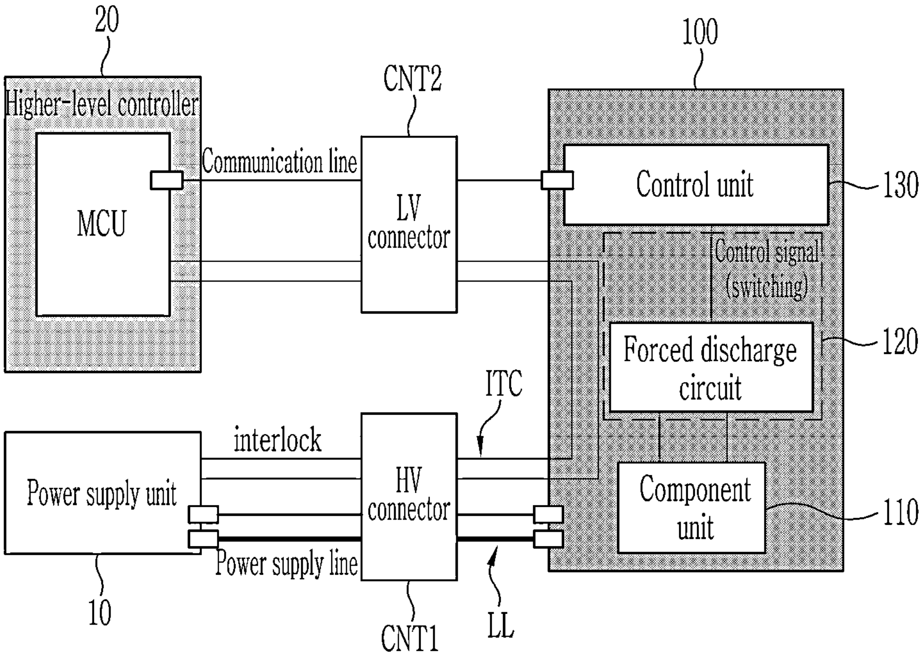
FIG. 2 is a block diagram of a forced discharge apparatus for a high-voltage component according to an embodiment.
Figure 3:
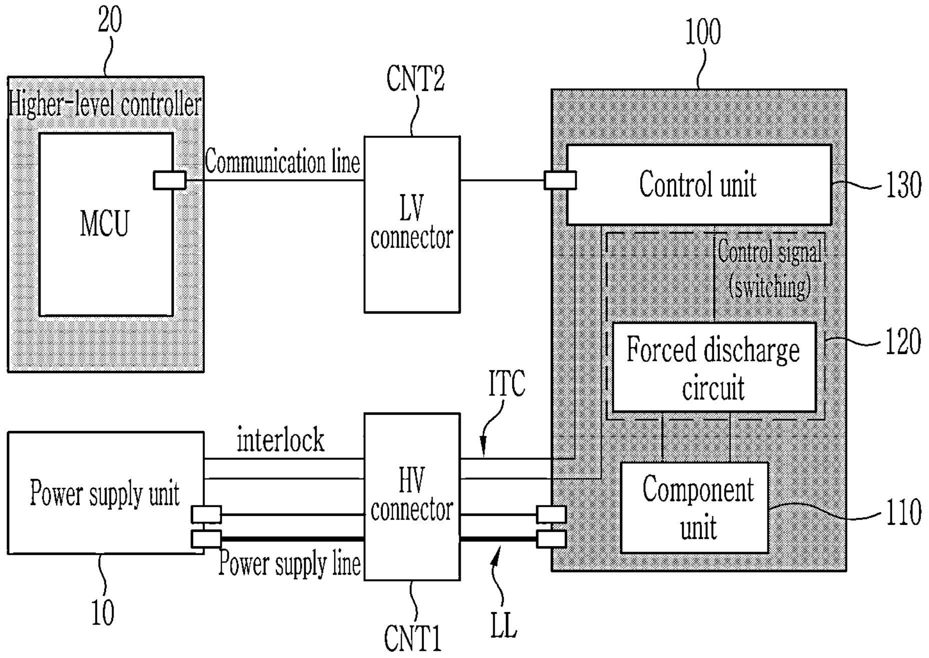
FIG. 3 is a block diagram of a forced discharge apparatus for a high-voltage component according to an embodiment.
Figure 4:
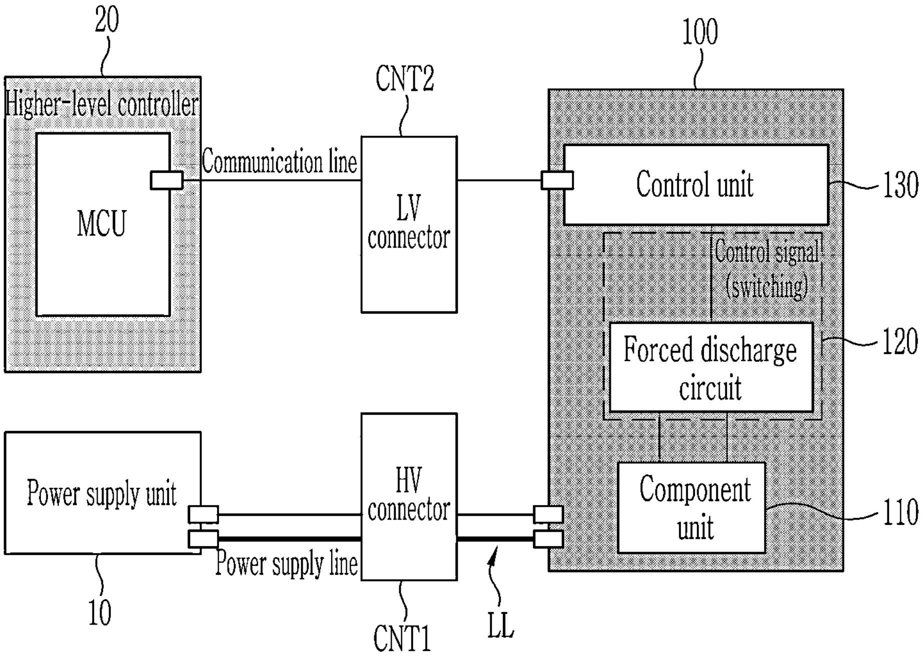
FIG. 4 is a block diagram of a forced discharge apparatus for a high-voltage component according to an embodiment.

FIG. 2 is a block diagram of a forced discharge apparatus for a high-voltage component according to an embodiment. FIG. 3 is a block diagram of a forced discharge apparatus for a high-voltage component according to an embodiment. FIG. 4 is a block diagram of a forced discharge apparatus for a high-voltage component according to an embodiment.

Referring to FIG. 2, FIG. 3, and FIG. 4, the forced discharge apparatus 100 may be connected to a cooperative controller 20. The cooperative controller 20 may be a higher-level controller having the control unit 130 of the forced discharge apparatus 100 as a lower-level control unit. An interlock function configured in the component unit 110 may be achieved through cooperative control with higher-level and lower-level control units. The forced discharge apparatus 100 includes a power supply line LL configured to connect the power supply unit 10 through the first connector CNT1. The forced discharge apparatus 100 includes a communication line connected to the higher-level controller 20 through a second connector CNT2. In addition, the forced discharge apparatus 100 may further include an interlock circuit ITC, in addition to the communication line and the power supply line LL.

FIG. 2 shows a structure of a forced discharge circuit of back electromotive force through cooperative control of the higher-level controller.

In FIG. 2, the forced discharge apparatus 100 may include the interlock circuit ITC connected to the power supply unit 10, the component unit 110, and the cooperative controller 20 through the first connector CNT1.

The interlock circuit ITC may be in a closed-circuit state when the first connector CNT1 and the second connector CNT2 are connected, and interlock circuit ITC may be disconnected when the first connector CNT1 is disconnected. The higher-level controller 20 may detect disconnection of the interlock circuit ITC and may perform a forced discharge through the forced discharge apparatus 100 and cooperative control.

When the first connector CNT1 is disconnected to disconnect the interlock circuit ITC, the higher-level controller 20 may request an electrical power cut to a battery management system (BMS), so as to block an electrical power entering the component unit 110. After the electrical power cut, the higher-level controller 20 may request forced self-discharge to the forced discharge apparatus 100.

FIG. 3 shows the structure of forced discharge circuit of a back electromotive force through self-interlock detection.

In FIG. 3, the forced discharge apparatus 100 may include the interlock circuit ITC that is connected to the control unit 130 and the power supply unit 10 through the first connector CNT1. The interlock circuit ITC is disconnected when the first connector CNT1 is separated.

When the interlock circuit ITC is disconnected, the control unit 130 may detect the disconnection of the interlock circuit ITC and may send an interlock occurrence signal to the higher-level controller 20.

FIG. 4 shows the structure of a forced discharge circuit of a back electromotive force structure through self-interlock detection according to an embodiment other than FIG. 3.

The control unit 130 may determine an occurrence of the interlock by detecting a voltage change of the component unit 110 generated when the first connector CNT1 is separated. When it is determined that the interlock has occurred according to an interlock separation, the control unit 130 may send the interlock occurrence signal to the higher-level controller 20.

In FIG. 2, FIG. 3, and FIG. 4, when detecting the disconnection of the interlock circuit ITC and the occurrence of the interlock, the control unit 130 may simultaneously start the forced discharge and determine occurrence of freewheeling.

Figure 5:
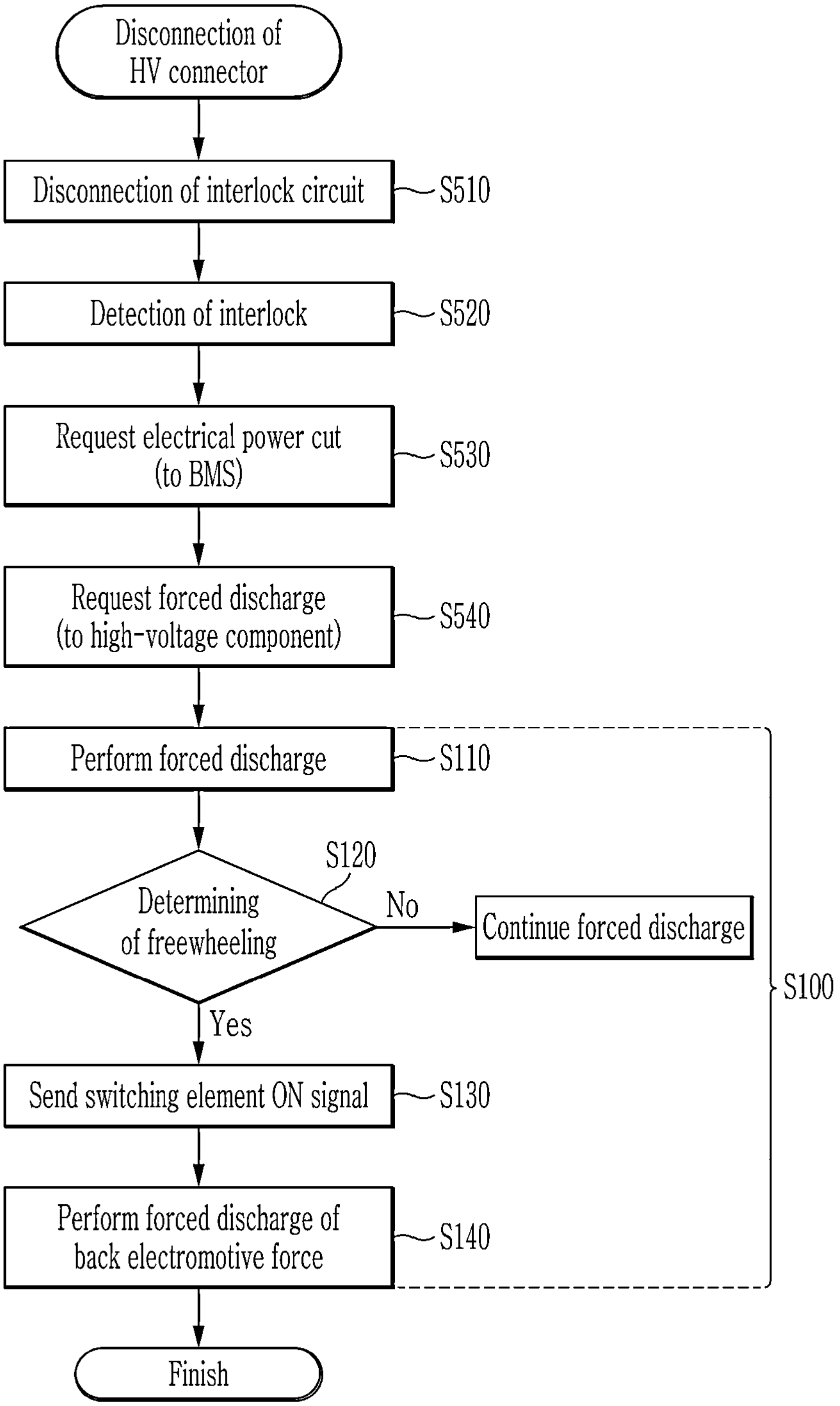
FIG. 5 is a flowchart of a forced discharge method for a high-voltage component according to an embodiment.
Figure 6:
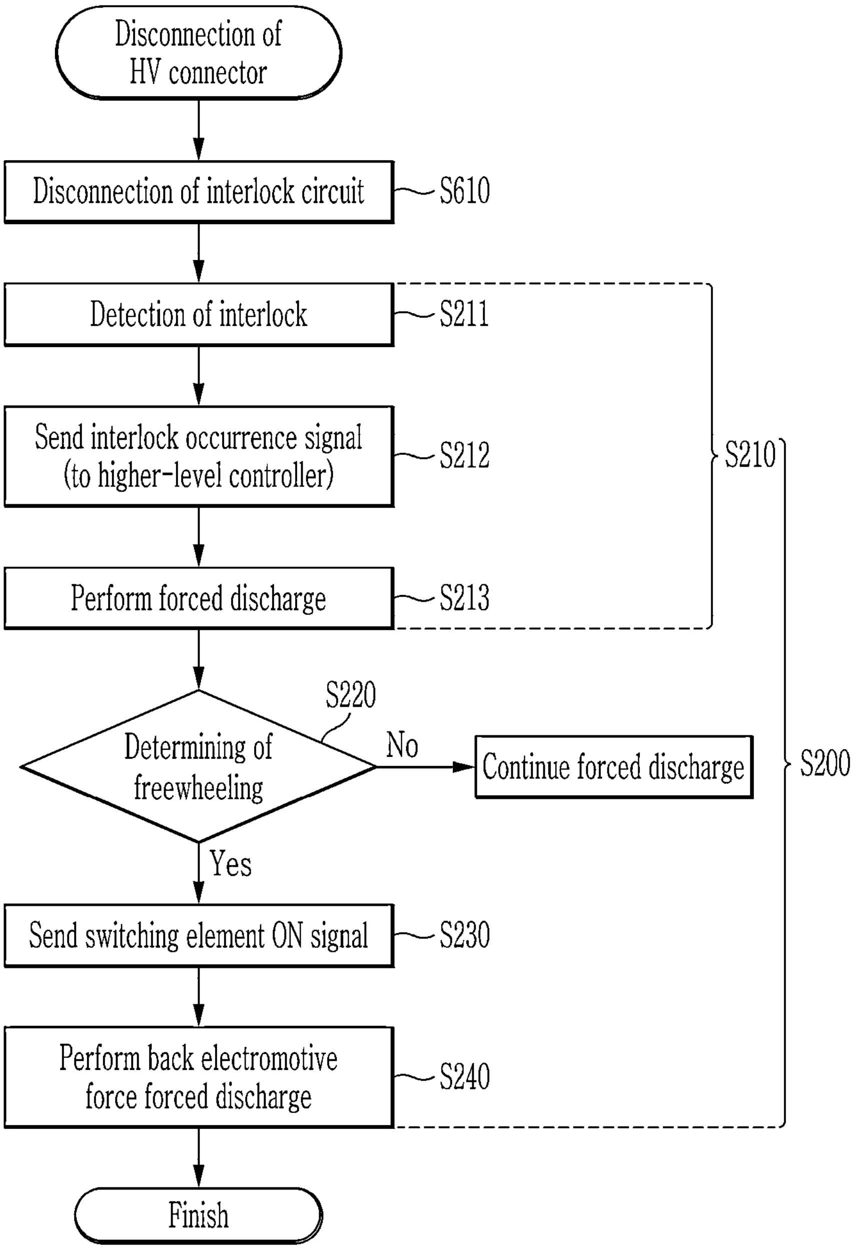
FIG. 6 is a flowchart of a forced discharge method for a high-voltage component according to an embodiment.
Figure 7:
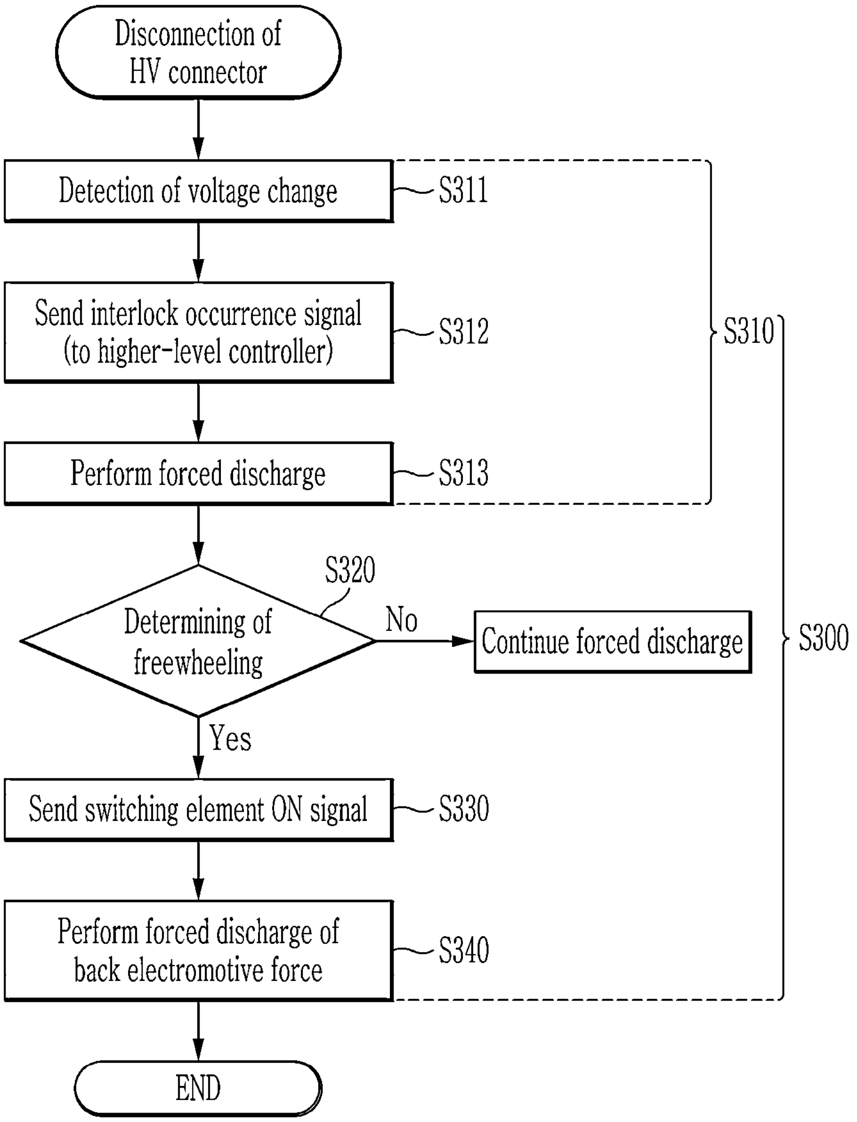
FIG. 7 is a flowchart of a forced discharge method for a high-voltage component according to an embodiment.

FIG. 5 is a flowchart of a forced discharge method for a high-voltage component according to an embodiment. FIG. 6 is a flowchart of a forced discharge method for a high-voltage component according to an embodiment. FIG. 7 is a flowchart of a forced discharge method for a high-voltage component according to an embodiment. The forced discharge method for a high-voltage component of FIG. 5, FIG. 6, and FIG. 7 may be performed through the forced discharge apparatus 100 according to the embodiment of FIG. 1. The description is made with reference to FIG. 1.

In FIG. 5, FIG. 6, and FIG. 7, at steps S100, S200, and S300, the forced discharge apparatus 100 may perform a back electromotive force forced discharge when the back electromotive force is generated.

At steps S110, S210, and S310, when the occurrence of the interlock is detected according to separation of the first connector CNT1 between the power supply unit 10 and the component unit 110, the forced discharge apparatus 100 may start the forced discharge.

At steps S120, S220, and S320, the forced discharge apparatus 100 may determine freewheeling or not by detecting whether the back electromotive force BP occurs at the component unit 110. When the back electromotive force BP is not detected, the forced discharge apparatus 100 continues the started forced discharge. In an embodiment, the forced discharge apparatus 100 may determine whether the back electromotive force occurs by comparing a current voltage of the component unit 110 according to the forced discharge after the start of the forced discharge and a back electromotive force value according to an operation RPM (revolutions per minute) of the component unit 110.

For example, in the case of the high-voltage cooling fan, when the operation RPM is 4550, the back electromotive force value may be 220V. At this time, the forced discharge apparatus 100 may determine that the back electromotive force is generated when the voltage of the component unit 110 is not lowered to below 220V but is maintained after the forced discharge.

When the generation of the back electromotive force BP is detected, the forced discharge apparatus 100 may perform the forced discharge that forcibly lowers the voltage of the component unit 110 to below the target voltage.

At steps S130, S230, and S330, the forced discharge apparatus 100 may send a switch ON signal to the switching element 121 of the forced discharge circuit 120 through the control unit 130. According to the switch ON signal, the forced discharge circuit 120 may be activated. At steps S140, S240, and S340, the forced discharge apparatus 100 may perform the forced discharge that lowers the voltage to below the target voltage of 60V through the power consumption elements 122*a* and 122*b*. The power consumption elements 122*a* and 122*b* may be one of a resistor or a varistor.

FIG. 5 is a flowchart illustrating a method forcibly discharging the back electromotive force (operation S100) through cooperative control of the higher-level controller by the forced discharge apparatus of FIG. 2.

In FIG. 5, when the interlock circuit ITC is disconnected according to separation of the first connector CNT1 at step S510, the higher-level controller 20 performing the cooperative control the control unit 130 of the forced discharge apparatus 100 may detect the occurrence of the interlock, at step S520.

At step S530, when a request of the electrical power cut to the occurrence of the interlock is detected, the higher-level controller 20 may request the electrical power cut to the battery management system (BMS).

At step S540, the higher-level controller 20 may request forced discharge to the forced discharge apparatus 100. Thereafter, the forced discharge apparatus 100 may start the forced discharge in response to the request at step S110, may determine whether freewheeling occurs at step S120, may turn ON the switching element 121 of the forced discharge circuit 120 at step S130 when the freewheeling occurs, and may perform the forced discharge at step S140.

FIG. 6 is a flowchart illustrating a method of forcibly discharging the back electromotive force (operation S200) through self-interlock detection by the forced discharge apparatus of FIG. 3.

In FIG. 6, at step S211, when the interlock circuit ITC is disconnected according to separation of the first connector CNT1 at step S610, the forced discharge apparatus 100 may detect the occurrence of the interlock through the control unit 130. At step S212, when the occurrence of the interlock is detected, the forced discharge apparatus 100 may immediately send the interlock occurrence signal to the higher-level controller 20. At step S213, when the occurrence of the interlock is detected, the forced discharge apparatus 100 may perform the forced discharge. Thereafter, the forced discharge apparatus 100 may determine at step S220 through the back electromotive force whether the freewheeling occurs, may turn ON the switching element 121 at step S230 through the forced discharge circuit 120 when the back electromotive force BP is detected, and may perform the forced discharge (i.e., forcibly discharging the back electromotive force) by using the power consumption elements 122*a* and 122*b* at step S240.

FIG. 7 is a flowchart illustrating a method of forcibly discharging the back electromotive force (operation S300) through self-interlock detection by the forced discharge apparatus of FIG. 4.

In FIG. 7, at step S311, the forced discharge apparatus 100 may detect the occurrence of the interlock by detecting a voltage change of the component unit generated according to disconnection of the first connector CNT1 connecting the power supply unit 10 and the component unit 110.

At step S312, when the occurrence of the interlock is detected, the forced discharge apparatus 100 may send the interlock occurrence signal to the higher-level controller 20. At step S313, the forced discharge apparatus 100 may start the forced discharge.

Thereafter, the forced discharge apparatus 100 may determine at step S320 through the back electromotive force whether the freewheeling occurs, may turn ON the switching element 121 at step S330 through the forced discharge circuit 120 when the back electromotive force BP is detected, and may perform the back electromotive force forced discharge by using the power consumption elements 122*a* and 122*b* at step S340. The forced discharge apparatus 100 may perform the back electromotive force forced discharge until the target voltage.

Figure 8:
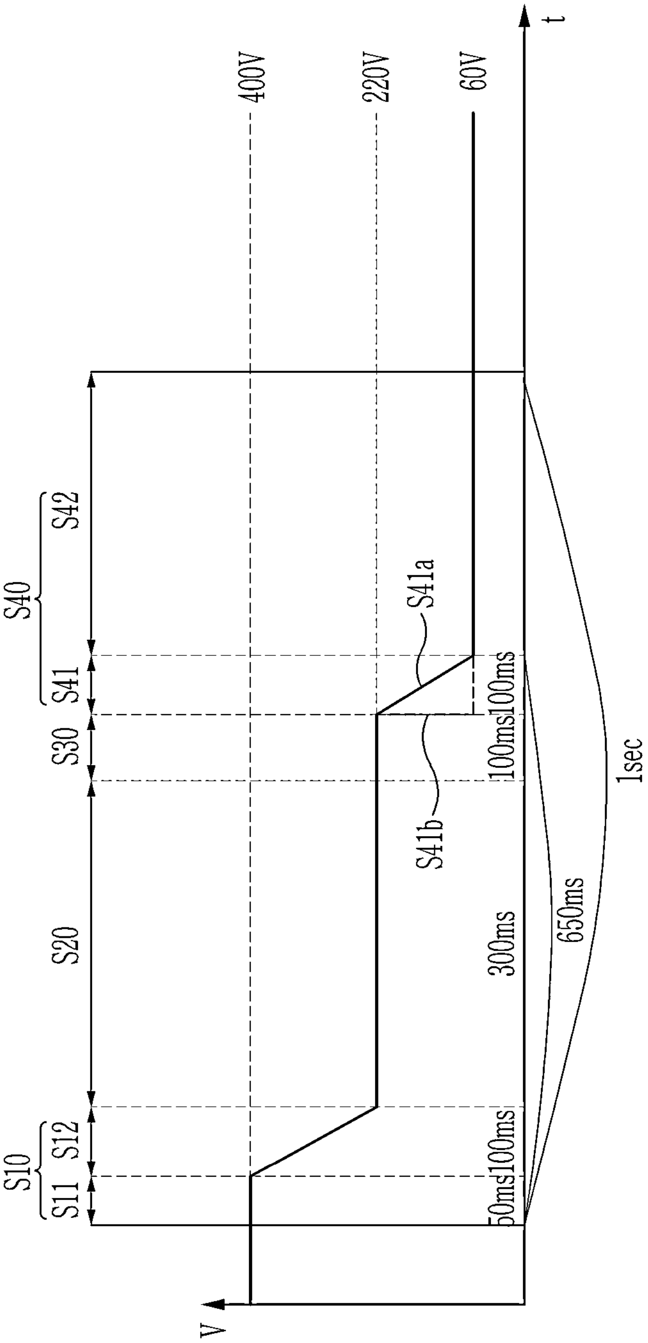
FIG. 8 is a graph showing an effect according to an embodiment.

FIG. 8 is a graph showing an effect according to an embodiment. FIG. 8 is a graph showing a forced discharge operation mechanism (S10 to S40) of the forced discharge apparatus 100 according to an embodiment of FIG. 1, when a back electromotive force occurs at a high-voltage cooling fan. The motor of the high-voltage cooling fan uses a rated voltage of 400V. At the operating RPM of 4550 of the high-voltage cooling fan, the back electromotive force is 220V.

In FIG. 8, at step S11, when the connector to the power supply is separated, the forced discharge apparatus 100 may detect the occurrence of the interlock for 50 ms.

At step S12, when the occurrence of the interlock is detected, the forced discharge apparatus 100 may start the forced discharge (high voltage component part) during 100 ms, may send the interlock occurrence signal to the higher-level controller, and may perform the cooperative control which requests the battery management system (BMS) to block electrical power.

At step S20, after starting the forced discharge, the forced discharge apparatus 100 may send the current voltage information of the motor for 300 ms and may determine freewheeling or not by comparing the back electromotive force value and the current voltage of the motor according to the operation RPM. Since the current voltage of the motor is 220V, it is determined that the freewheeling phenomenon due to back electromotive force is generated.

At step S30, when the freewheeling is detected, the forced discharge apparatus 100 may send the switch ON signal to the switching element 121 of the forced discharge circuit 120 for 100 ms.

At step S41, the forced discharge apparatus 100 may perform the back electromotive force forced discharge through a resistor 122*a* or a varistor 122*b* included in the power consumption elements 122*a* and 122*b* according to the switch ON signal. At step S41*a*, when performing the back electromotive force forced discharge by using the resistor 122*a*, the forced discharge apparatus 100 may linearly decrease the voltage for 100 ms. At step S41*b*, when performing the back electromotive force forced discharge through the varistor 122*b*, the forced discharge apparatus 100 may decrease the voltage to the target voltage of 60V, simultaneously with the switch ON signal.

At step S42, after the occurrence of the interlock due to connector separation, the forced discharge apparatus 100 may lower and maintain the voltage of the high-voltage component to be below 60V, by the forced discharge.

The forced discharge apparatus 100 may decrease the voltage to 60V through the back electromotive force forced discharge for 650 ms. The forced discharge apparatus 100 may perform the back electromotive force forced discharge mechanism within 1 second.

While this disclosure has been described in connection with what is presently considered to be practical embodiments, it should be understood that the present disclosure is not limited to the disclosed embodiments. Instead, the present disclosure is intended to cover various modifications and equivalent arrangements included within the spirit and scope of the appended claims.

DESCRIPTION OF SYMBOLS

10: power supply unit
20: the higher-level controller
100: forced discharge apparatus
110: component unit
120: forced discharge circuit
121: switching element
122*a*, 122*b*: power consumption element
130: control unit

What is claimed is:

1. A forced discharge apparatus for a high-voltage component, the apparatus comprising:

a component unit connected to a power supply unit through a connector;

a forced discharge circuit connected between the power supply unit and the component unit; and a control unit configured to detect whether a freewheeling phenomenon occurs in the component unit by comparing a current voltage of the component unit with a back electromotive force value corresponding to an operation RPM (revolutions per minute) of the component unit, and discharge the component unit through the forced discharge circuit such that a voltage of the component unit becomes below a target voltage in response to a detection that a back electromotive force is generated from the component unit due to the freewheeling phenomenon when the connector is separated.

2. The forced discharge apparatus of claim 1, wherein the forced discharge circuit comprises a switching element connected to the control unit and comprises a power consumption element connected to the switching element.

3. The forced discharge apparatus of claim 2, wherein the power consumption element is electrically connected to the power supply unit through the switching element.

4. The forced discharge apparatus of claim 3, wherein the power consumption element comprises at least one of a resistor or a varistor.

5. The forced discharge apparatus of claim 4, wherein when the back electromotive force is detected, the control unit is configured to apply a switching signal to the switching element, and wherein when the switching signal is applied to the switching element, the power consumption element is connected to both ends of the power supply unit to lower a voltage due to the back electromotive force.

6. The forced discharge apparatus of claim 1, further comprising an interlock circuit configured to be connected to the power supply unit, the component unit, and a cooperative controller through the connector and configured to be disconnected when the connector is separated, wherein when the interlock circuit is disconnected, the cooperative controller is configured to detect an occurrence of an interlock and request an electrical power cut to a battery management system (BMS).

7. The forced discharge apparatus of claim 1, further comprising an interlock circuit configured to be connected to the control unit and the power supply unit through the connector and configured to disconnected when the connector is separated, wherein the control unit is configured to detect an occurrence of an interlock according to a disconnection of the interlock circuit and send an interlock occurrence signal to a cooperative controller configured to perform a cooperative control together with the control unit.

8. The forced discharge apparatus of claim 1, wherein the control unit is configured to:

detect an occurrence of an interlock based on a voltage change of the component unit generated when the connector is separated; and send an interlock occurrence signal to a cooperative controller when the occurrence of the interlock is detected.

9. A forced discharge method for a high-voltage component, the method comprising:

detecting, by a forced discharge apparatus, whether a connector, which connects a component unit to a power supply unit, is separated;

detecting whether a freewheeling phenomenon occurs in the component unit by comparing, by the forced discharge apparatus, a current voltage of the component unit with a back electromotive force value corresponding to an operation RPM (revolutions per minute) of the component unit; and performing, by the forced discharge apparatus, forced discharge of the component unit through a forced discharge circuit connected between the power supply unit and the component unit such that a voltage of the component unit becomes below a target voltage in response to a detection that a back electromotive force is generated from the component unit due to the free-wheeling phenomenon when the connector is separated.

10. The forced discharge method of claim 9, wherein performing the forced discharge comprises applying a switching signal to a forced discharge circuit, and wherein the switching signal activates the forced discharge circuit that includes a switching element and a power consumption element.

11. The forced discharge method of claim 10, wherein the power consumption element comprises at least one of a resistor or a varistor.

12. The forced discharge method of claim 9, further comprising:

detecting the occurrence of the interlock, by a cooperative controller configured to detect whether an interlock circuit connected to the power supply unit, the component unit, and a cooperative controller is disconnected;

requesting an electrical power cut to a battery management system (BMS); and requesting the forced discharge to the forced discharge apparatus.

13. The forced discharge method of claim 9, wherein the starting the forced discharge comprises:

detecting the occurrence of the interlock according to disconnection an interlock circuit connected to a control unit and the power supply unit; and sending an interlock occurrence signal to a cooperative controller configured to perform a cooperative control together with the control unit.

14. The forced discharge method of claim 9, wherein the starting the forced discharge comprises:

detecting the occurrence of the interlock by detecting a voltage change of the component unit generated according to separation of the connector; and sending an interlock occurrence signal to a cooperative controller.

* * * * *